Feb. 2, 1943. G. I. GOODWIN 2,309,950
CLUTCH PLATE
Filed March 29, 1940 3 Sheets-Sheet 3
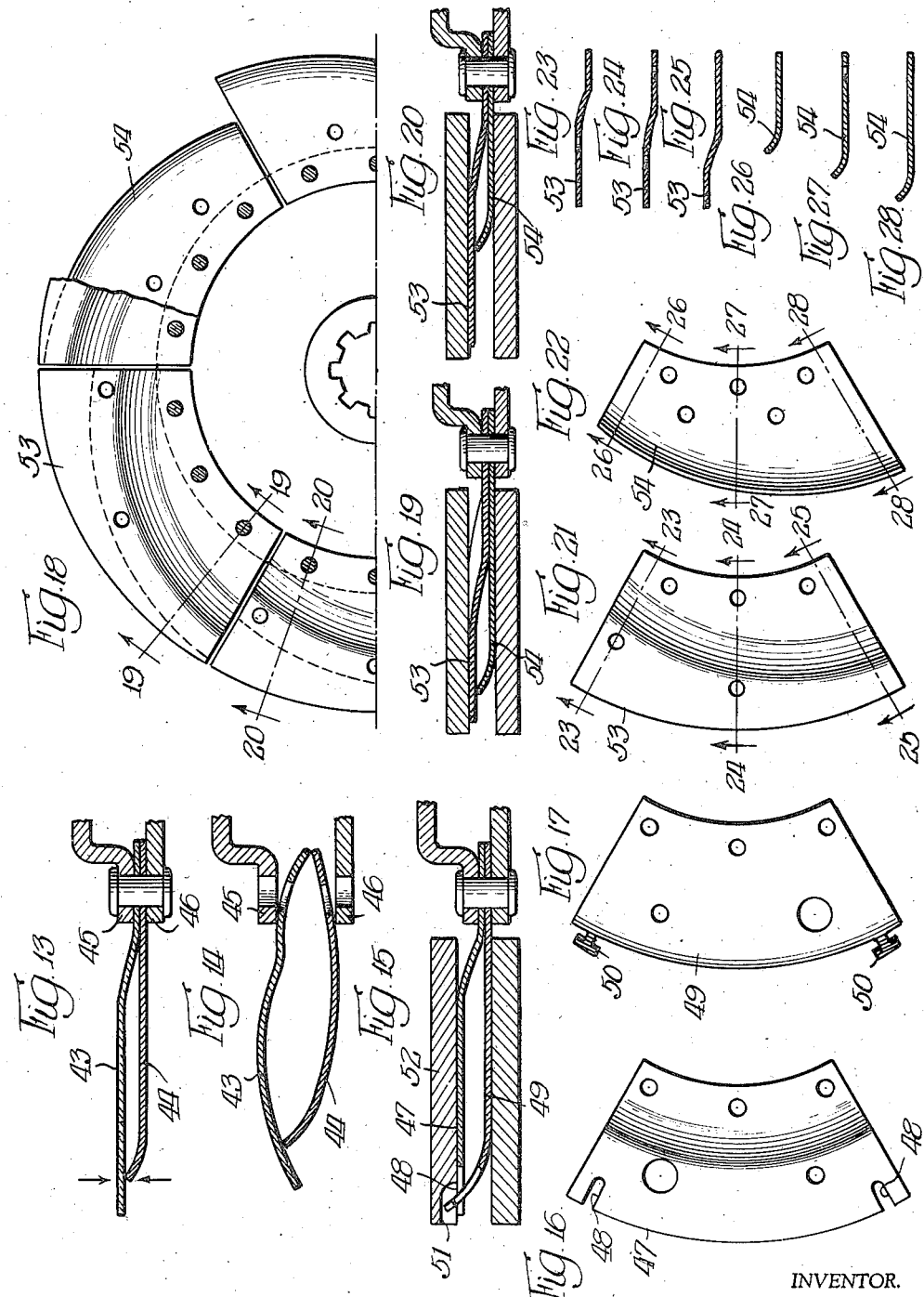
INVENTOR.
George I. Goodwin,
BY Cromwell, Greist & Warden
attys Patented Feb. 2, 1943

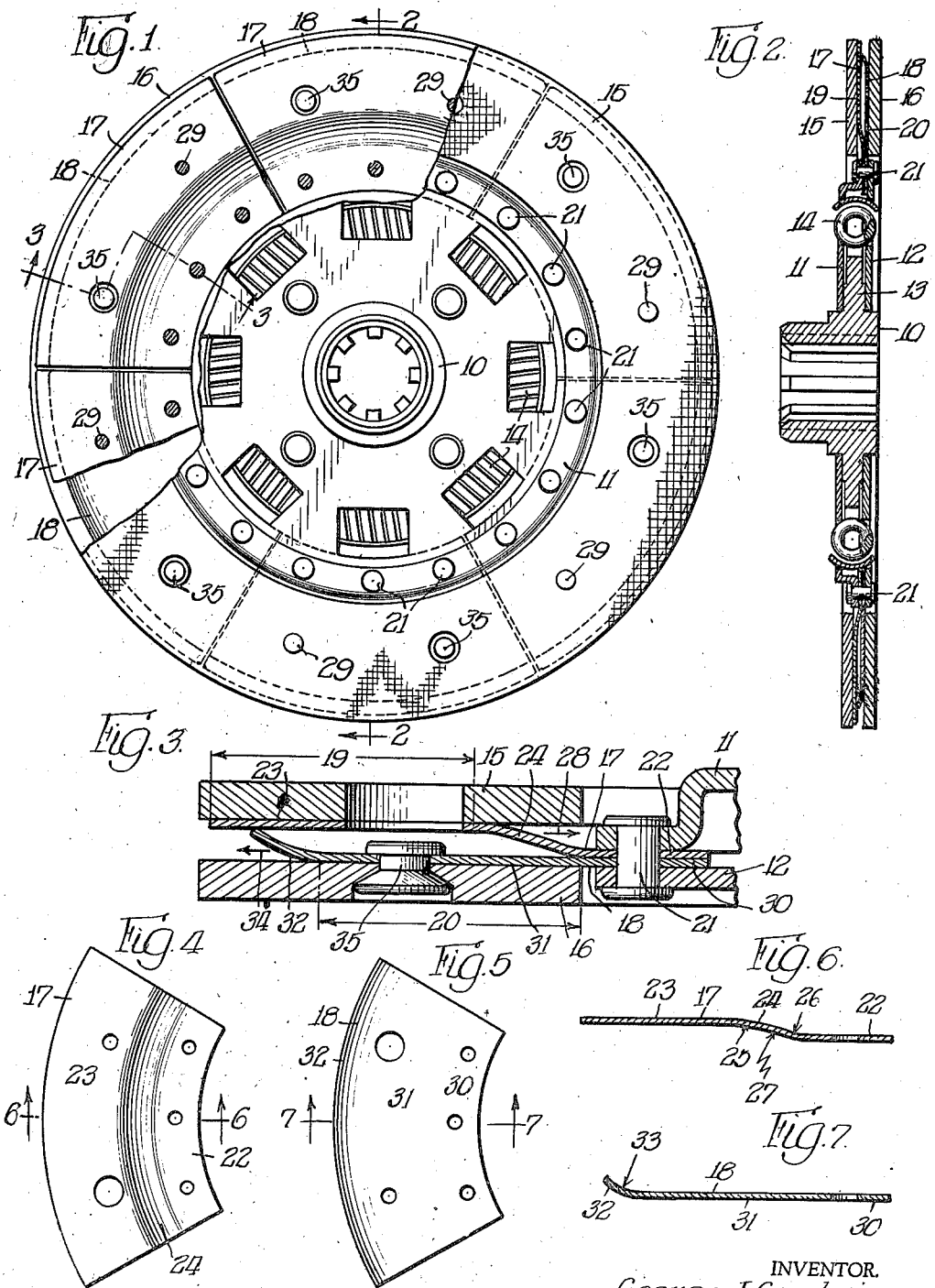

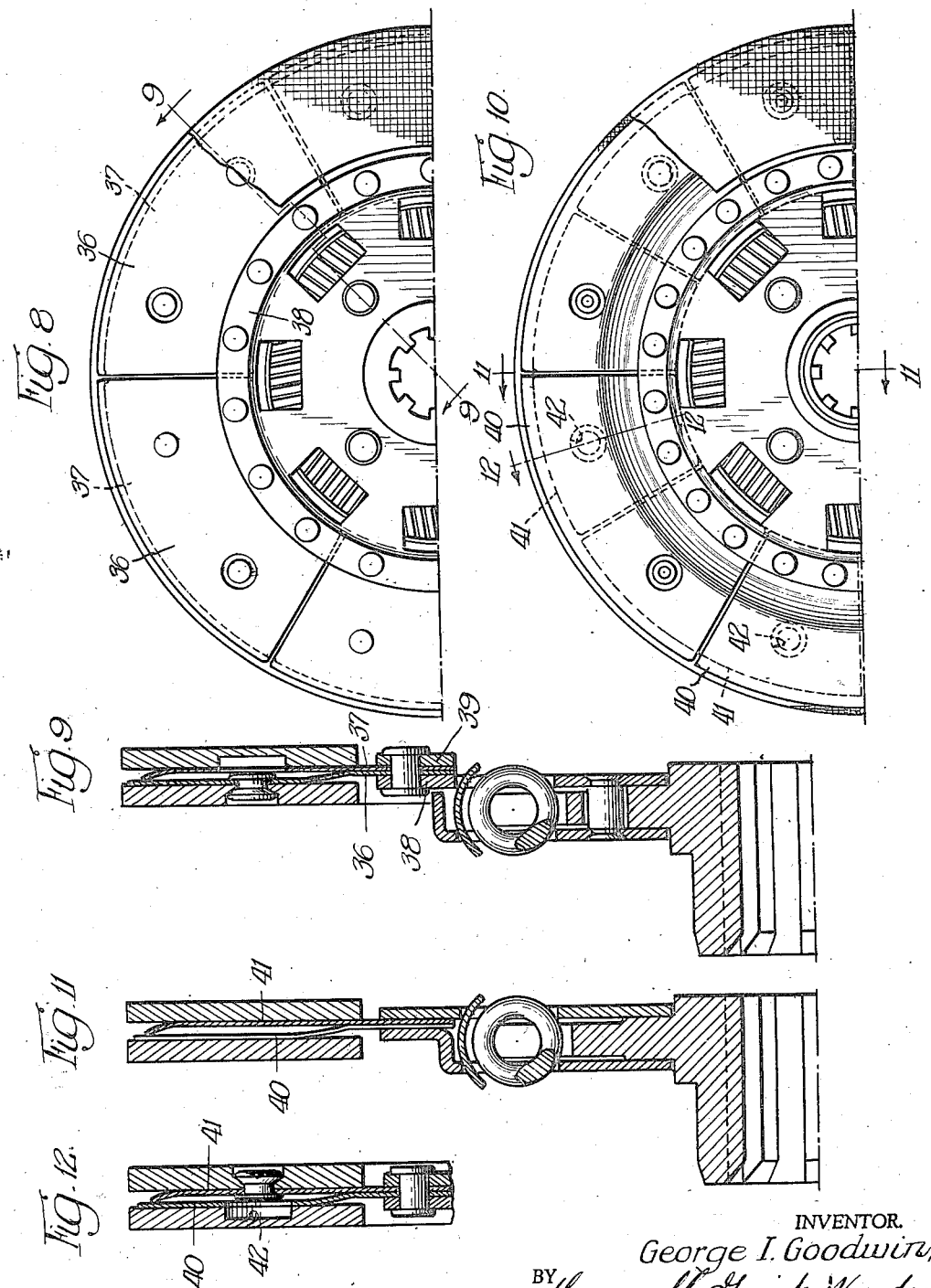

2,309,950

UNITED STATES PATENT OFFICE 2,309,950

CLUTCH PLATE

George I. Goodwin, Detroit, Mich.

Application March 29, 1940, Serial No. 326,752

9 Claims. (Cl. 192—107)

This invention has to do with clutch plates, and is particularly concerned with the cushioning of the annular friction facings carried by and forming a part of such plates.

The principal object of the invention is to provide, in a clutch plate, an improved spring cushion for compression loading, which cushion yieldingly resists movement of the facings towards each other and affords relatively large circumferentially continuous supporting areas for the backs of both facings in the uncompressed as well as compressed conditions of the cushion.

Another important object is to provide a cushion of the character described in which the supporting areas presented by the cushion are so arranged that one of the areas increases in size inwardly under compression while the other area increases in size outwardly under compression, with the result that the effective mean radii of the supporting areas as a whole will remain approximately constant throughout all stages of compression.

The improved cushion preferably though not necessarily consists of a large number of segmental spring members which are positioned back-to-back between the facings and are so shaped and arranged as to provide flat arcuate supporting portions of considerable radial extent for engagement with the backs of the facings and at the same time provide integrally formed interengaging portions for producing under compression an effective cushioning action.

The supporting area for one of the facings preferably extends from the outer edge of that facing inwardly, and the supporting area for the other facing preferably extends from the inner edge of that facing outwardly, so that the inner portion of the supporting area for the first mentioned facing is disposed in radially overlapped relation to the outer portion of the supporting area for the second mentioned facing. The segmental spring members are preferably curved axially from one plane into another along arcuate bend lines which extend circumferentially of the assembly in concentric relation to the axis of the plate, all radial sections through each spring member being substantially identical. This special shaping of the segmental spring members, along arcuate bend lines as distinguished from straight bend lines, resembles somewhat the shaping of corresponding segments of shallow dishes or plates. The supporting areas for the facings, although produced with a number of separate spring members, are in effect circumferentially continuous, with the result that the unit pressure exerted by the spring members in resisting compression will be substantially uniform at all points about the facings.

Other more specific objects and advantages of the invention will be evident to those skilled in the art upon a full understanding of the construction, arrangement and operation of the improved cushion structure.

A preferred embodiment of the invention, and other slightly modified forms thereof, are presented herein for the purpose of exemplification, but it will of course be appreciated that the invention is susceptible of incorporation in other structurally modified forms coming equally within the scope of the appended claims.

In the accompanying drawings:

Fig. 1 is a face view of a clutch plate equipped with the cushion of the invention, with portions broken away to show otherwise concealed portions;

Fig. 2 is a diametric section through the clutch plate, taken on the line 2—2 of Fig. 1;

Fig. 3 is an enlarged radial section through the outer portion of the clutch plate;

Fig. 4 is a face view of one of the segmental spring members in the set which underlies one of the facings;

Fig. 5 is a face view of one of the differently shaped segmental spring members in the set which underlies the other facing;

Fig. 6 is a radial section, taken on the line 6—6 of Fig. 4;

Fig. 7 is a radial section, taken on the line 7—7 of Fig. 5;

Fig. 8 is a face view of one-half of another clutch plate, showing a slightly modified form of the invention;

Fig. 9 is a radial section, taken on the line 9—9 of Fig. 8;

Fig. 10 is a face view of one-half of another clutch plate, showing another modification of the invention;

Fig. 11 is a radial section, taken on the line 11—11 of Fig. 10;

Fig. 12 is a fragmentary radial section, taken on the line 12—12 of Fig. 10;

Fig. 13 is a radial section through the spring members and side plates, showing the shape of the spring members after the same have been clamped together by the side plates;

Fig. 14 is a similar section, showing in somewhat exaggerated form a special shaping which the spring members may be given before being clamped together, which shaping is designed to cause the spring members to exert pressure against each other in the completed assembly in the uncompressed condition of the facings;

Fig. 15 is a radial section, showing one way in which the spring members may be slidably interlocked with each other to prevent them from separating in the uncompressed condition of the facings;

Figs. 16 and 17 are face views of the two spring members shown in Fig. 15;

Fig. 18 is a partially assembled face view of one-half of a clutch plate in which the arcuate bend lines of the spring members are eccentric with respect to the axis of the plate, all parts of the assembly with the exception of one of the side plates and the spring members being omitted from this view;

Fig. 19 is a radial section through a clutch plate of the construction shown in Fig. 18, the section being taken through the plate at the location of the line 19—19 on Fig. 18;

Fig. 20 is a similar section, taken at the location of the line 20—20 on Fig. 18;

Figs. 21 and 22 are face views of two of the coacting spring members shown in Fig. 18;

Figs. 23, 24 and 25 are radial sections through the spring members shown in Fig. 21, taken respectively on the lines 23—23, 24—24 and 25—25; and Figs. 26, 27 and 28 are radial sections through the spring member shown in Fig. 22, taken respectively on the lines 26—26, 27—27 and 28—28.

The clutch plate shown in Figs. 1 to 7, inclusive, includes a hub 10, two side plates 11 and 12 which are rotatably mounted on the hub at opposite sides of a flange 13, springs 14 which yieldingly resist rotation of the side plates relative to the flange, two annular friction facings 15 and 16, a set of cushion springs 17 in engagement with the facing 15, and another set of cushion springs 18, arranged back-to-back with respect to the first set, in engagement with the facing 16. This particular clutch plate is of the spring center type, but the present invention is applicable to clutch plates of all types.

The invention resides in the form and arrangement of the springs 17 and 18, resulting in circumferentially continuous supporting areas for both facings, with the supporting area 19 for the facing 15 extending from its outer edge to a point near its inner edge and the supporting area 20 for the facing 16 extending from its inner edge to a point near its outer edge, in radially lapped relation to the area 19.

The springs 17 and 18 are of segmental shape and are arranged in annular array back-to-back about the outer edges of the side plates 11 and 12, in outwardly projecting relation to the latter. The springs 17 and 18 are secured in position by having their inner edges clamped between the outer edges of the side plates 11 and 12, by means of rivets 21.

The springs 17 are characterized by (1) flat inner portions 22, (2) flat outer portions 23 which are offset axially with respect to the inner portions 22 in a direction away from the springs 18, and (3) curved portions 24 which connect the flat portions 22 and 23. The portions 24 are axially curved, in the sense that the bending of the same occurs in a plane which passes through the axis of the assembly. The curved portions 24 are formed on three tangent radii 25, 26 and 27 (see Fig. 6). The radii 25 and 26 are quite short, while the radius 27 is quite long. The portions 22, 23 and 24 are each of arcuate shape and extend circumferentially of the clutch plate about the center of the latter. As a result of this, all radial sections through the springs 17, regardless of where the sections are taken, will be the same. The flat outer portions 23 of the springs are of considerably greater radial extent than the flat inner portions 22 and bear flatly against the outer portion of the facing 15 throughout the previously mentioned supporting area 19, which area increases gradually in width toward the center of the assembly in the direction of the arrow 28 in Fig. 3 as pressure is brought to bear on the facing 15 and the curved portions 24 of the springs 17 caused to progressively flatten out against the facing in the direction of the arrow. The facing 15 is fastened to the flat outer portions 23 of the springs 17 by means of rivets 29.

The springs 18 are characterized by (1) flat inner portions 30, (2) flat intermediate portions 31 which continue outwardly in the same plane as the inner portions 30, and (3) axially curved outer portions 32 which extend toward the springs 17 into radial sliding engagement with the backs of the flat outer portions 23 of the latter. The curved outer portions 32 are formed on a radius 33 (see Fig. 7). The portions 30, 31 and 32 are each of arcuate shape and extend circumferentially of the clutch plate about the center of the latter, with the result that, as with the springs 17, all radial sections through the springs 18 will be the same. The flat intermediate portions 31 of the springs 18 bear flatly against the facing 16 throughout the previously mentioned supporting area 20, which area increases gradually in width toward the outside of the assembly in the direction of the arrow 34 in Fig. 3 as pressure is brought to bear on the facing 16 and the curved portions 32 of the springs 18 caused to progressively flatten out against the facing in the direction of the arrow. The facing 16 is fastened to the flat intermediate portions 31 of the springs 18 by means of rivets 35.

As the paired springs 17 and 18 come closer together under load the beam lengths of the springs decrease, both as a result of the increase in the radial extent of the supporting areas 19 and 20 and as a result of the increase in the radial extent of the contact between the inner portions 22 and 30 of the springs, which decrease accelerates the rate of build-up of the resistance offered by the cushion springs. It will be noted that the springs 17 provide two kinds of loading, namely, a double beam support with the load applied between the points of such support, and a cantilever support resulting from the rigid clamping of the inner portions 22, and that both kinds of loading are modified by the curvature of the springs along arcuate bend lines, necessitating a stretching of the metal in the direction of the bend lines in order to permit flattening of the curved sections. As will be observed, the paired springs 17 and 18 provide a hollow cushion which in radial section has much the shape of an oblique parallelogram in which two sides are movable toward and away from each other in the operation of the cushion. While the facings 15 and 16 and the portions of the paired springs 17 and 18 supporting the same have been illustrated as parallel to each other, it will of course be appreciated that the invention is equally applicable to structures in which the facings and supporting portions of the springs are not strictly parallel.

In the modification shown in Figs. 8 and 9 the springs 36 and 37, instead of being clamped between two cover plates, are clamped between a single cover plate 38 and an additional ring 39. By employing the ring 39 in securing the springs 36 and 37 to the cover plate 38, the cantilever action which was mentioned above is obtained.

In the modification shown in Figs. 10, 11 and 12 the paired springs 40 and 41, instead of being located directly behind each other, are staggered circumferentially of the assembly, so that each of the springs 40 laps two of the springs 41, and vice versa. This staggered arrangement affords mutual support for the springs about the entire circumference of the assembly and tends to keep all of the springs in proper alignment.

It will be observed in this modification, as well as in the last described modification, that the clearance holes in each facing for the rivets holding the other facing do not go all of the way through the facing, thereby utilizing as much of the area of the facing as possible for its intended purpose. This increase in friction area over constructions in which the clearance holes go all of the way through the facings (as illustrated in the first described embodiment), presents no problem in connection with a cushion structure of the kind under consideration because the facings may be separately riveted or otherwise attached to the two sets of springs before the inner portions of the springs are fastened to the center portion of the assembly.

In Fig. 13 a pair of pre-loaded springs 43 and 44 are shown clamped together between the outer edges of cover plates 45 and 46. The shaping of these springs, before being clamped together, is illustrated with some exaggeration in Fig. 14. By preliminarily shaping the springs in this fashion the springs will exert resilient pressure against each other when assembled, at the points indicated by the opposed arrows in Fig. 13, the initial excess curvature shown in Fig. 14 being of such degree as to result in the shaping shown in Fig. 13 with all parts assembled. This pressure or pre-load will tend to prevent the springs, and consequently the facings, from moving apart in the uncompressed condition of the cushion. It will of course be appreciated that this pre-loading is not at all essential to the present invention, although under some circumstances it may be found quite desirable. The facings may also be maintained against excess separation by the provision of interlocking means such as shown in Figs. 15, 16 and 17, which interlocking means may be used in place of or in addition to a resilient pre-load. In the modification shown in Figs. 15, 16 and 17 the upper springs 47 are provided in their outer edges with narrow slots 48, and the lower springs 49 are provided beyond their outer edges with headed tabs 50, which tabs extend upwardly through the slots 48 and slidingly interlock with the upper surfaces of the springs 47, within recesses 51 provided in the outer edge of the back of the adjacent facing 52.

In the modification of the invention shown in Figs. 18 to 28, inclusive, the paired spring segments 53 and 54 are curved along arcuate bend lines which are eccentric with respect to the axis of the clutch plate, producing a multi-spiral design.

In this modified structure, the supporting areas presented by the spring segments for the facings vary in radial width from one end of each pair of springs to the other end, jogging radially at the ends of each pair in continuing about the circumference of the assembly. As will be observed in Fig. 18, this spiraling arrangement of the arcuate bend lines permits the rivets for the facings to be located at different distances from the edges of the facings.

I claim:

1. In a clutch plate, a pair of friction facings, and a pair of segmental cushion springs between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly.

2. In a clutch plate, a pair of friction facings, and a pair of segmental cushion springs between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly, and the two supporting areas overlapping each other radially.

3. In a clutch plate, a pair of friction facings, and a pair of segmental cushion springs between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly, said springs having axially offset portions in engagement with each other, which portions are designed to flatten out under pressure applied to the facings.

4. In a clutch plate, a pair of friction facings, and a pair of segmental cushion springs between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly, said outer supporting area enlarging inwardly during compression of the cushion.

5. In a clutch plate, a pair of friction facings, and a pair of segmental cushion springs between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly, said inner supporting area enlarging outwardly during compression of the cushion.

6. In a clutch plate, a pair of friction facings, and a pair of segmental cushion springs arranged back-to-back between the facings, one spring being attached to one facing, and the other spring being attached to the other facing, each spring providing a circumferentially extending supporting area for the facing to which it is attached, with the supporting area for one facing extending from its outside inwardly, and the supporting area for the other facing extending from its inside outwardly.

7. In a clutch plate, a pair of friction facings, and two sets of segmental cushion springs arranged between the facings in back-to-back relationship and so formed that the springs themselves provide continuous circumferentially extending flat supporting surfaces for both of the facings, said flat supporting surfaces being eccentric with respect to the axis of the clutch plate, whereby to produce a multi-spiral design.

8. In a clutch plate, a pair of parallel substantially rigid friction facings, and two sets of segmental cushion springs arranged between the facings in back-to-back relationship and so formed that the springs themselves provide continuous circumferentially extending flat supporting surfaces for both of the facings, one of said cushion springs having a circumferentially extending portion which is disposed flatly against one of the friction facings throughout a substantial portion of the radial extent of the latter, and having a circumferentially extending axially curved portion which is designed to flatten out progressively in a radial direction into engagement with the facing upon compression of the cushion.

9. In a clutch plate, a pair of parallel substantially rigid friction facings, and two sets of segmental cushion springs arranged between the facings in back-to-back relationship and so formed that the springs themselves provide continuous circumferentially extending flat supporting surfaces for both of the facings, each supporting area in the uncompressed condition of the plate providing a support for more than half the entire area of its associated facing, one of said cushion springs having a circumferentially extending portion which is disposed flatly against one of the friction facings throughout a substantial portion of the radial extent of the latter, and having a circumferentially extending axially curved portion which is designed to flatten out progressively in a radial direction into engagement with the facing upon compression of the cushion.

GEORGE I. GOODWIN.